Figure 3:
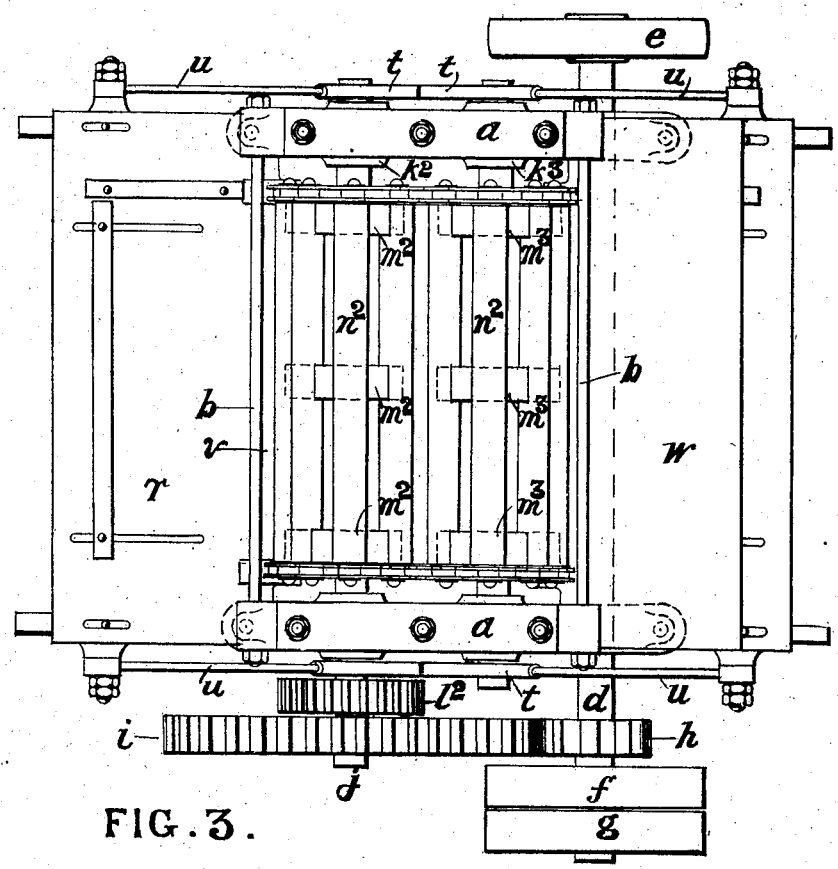

No. 827,419. PATENTED JULY 31, 1906.
W. G. CAUSER.
APPARATUS FOR MAKING CORRUGATED METAL SHEETS OR PLATES.
APPLICATION FILED OCT. 6, 1905.
3 SHEETS—SHEET 1.
FIG. 5.
FIG. 1.
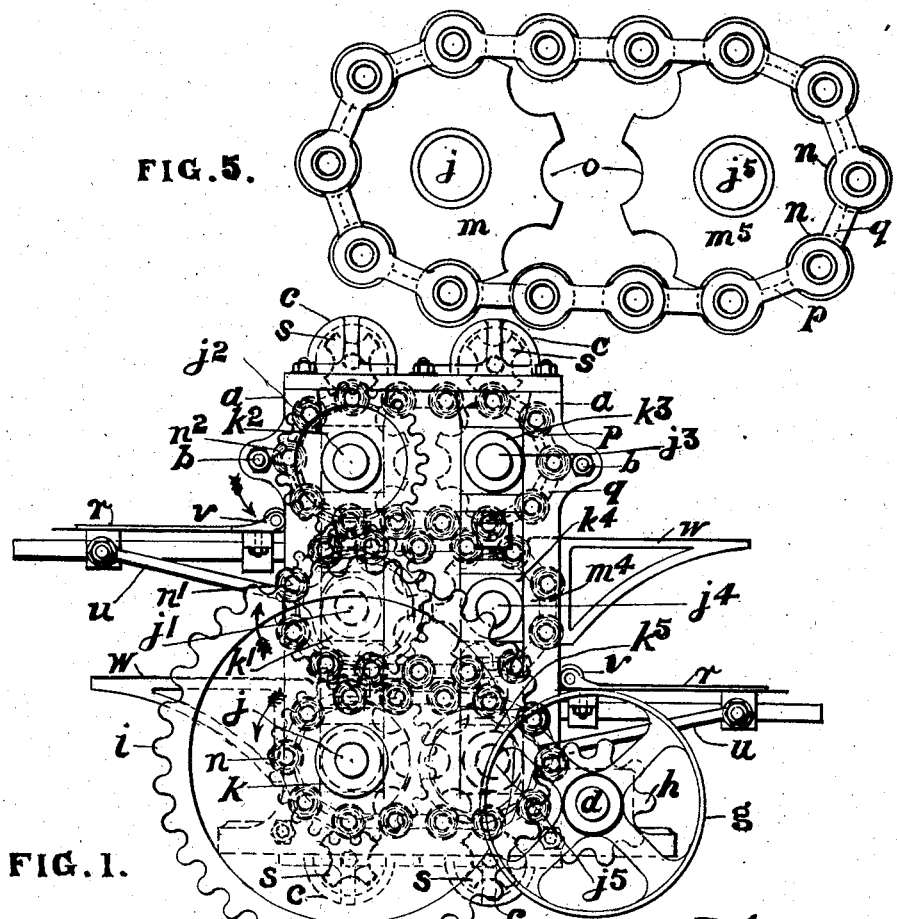
FIG. 4.
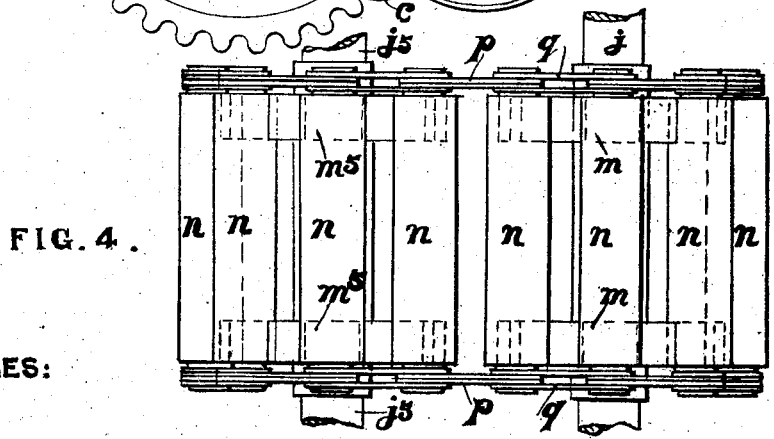
WITNESSES:
INVENTOR
William Geo Causer
BY Edgar Tate & Co.
ATTORNEYS.

No. 827,419. PATENTED JULY 31, 1906.
W. G. CAUSER.
APPARATUS FOR MAKING CORRUGATED METAL SHEETS OR PLATES.
APPLICATION FILED OCT. 6, 1905.
3 SHEETS—SHEET 2.
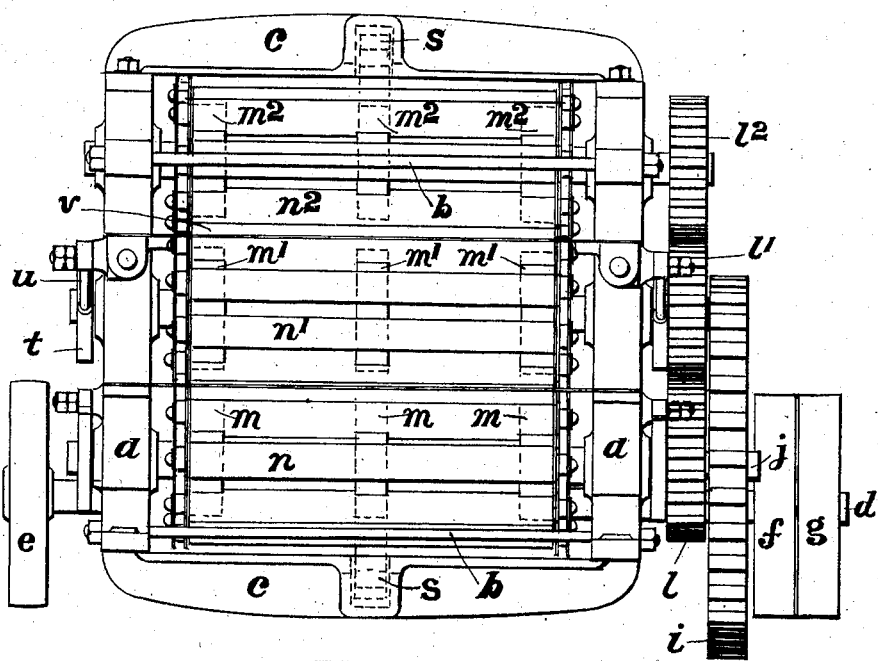
FIG. 2.
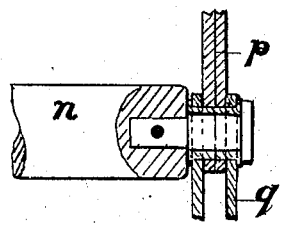
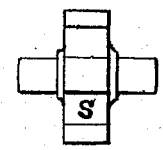
FIG. 6.  FIG. 7.  FIG. 8.  FIG. 9.
WITNESSES:  INVENTOR
William Geo Causer
BY
Edgar Tate & Co
ATTORNEYS No. 827,419. PATENTED JULY 31, 1906.
W. G. CAUSER.
APPARATUS FOR MAKING CORRUGATED METAL SHEETS OR PLATES.
APPLICATION FILED OCT. 6, 1905.

3 SHEETS—SHEET 3.

WITNESSES:

INVENTOR
William Geo Causer
BY Edgar Tate & Co
ATTORNEYS

UNITED STATES PATENT OFFICE.

WILLIAM GEORGE CAUSER, OF BIRMINGHAM, ENGLAND.

APPARATUS FOR MAKING CORRUGATED METAL SHEETS OR PLATES.

No. 827,419.　　　　　Specification of Letters Patent.　　　Patented July 31, 1906.

Application filed October 6, 1905. Serial No. 281,612.

*To all whom it may concern:*

Be it known that I, WILLIAM GEORGE CAUSER, a subject of the King of Great Britain, residing at Birmingham, in the county of Warwick, England, have invented certain new and useful Improvements in Apparatus for Making Corrugated Metal Sheets or Plates, of which the following is a specification, such as will enable those skilled in the art to which it appertains to make and use the same.

This invention relates to apparatus or machinery for making corrugated metal plates or sheets; and the object of the invention is to provide an improved machine or apparatus for the purpose specified which is simple in construction and operation and by means of which corrugated metal plates or sheets of various forms or configuration in cross-section may be made, a further object being to provide a continuous process of corrugation and automatic delivery of the sheet or plate after corrugation without undue friction or tendency to rupture the material under operation, which objects are accomplished by passing the plates or sheets between revolving dies, parts of which are flexibly connected and shaped to suit the particular form of corrugation or configuration desired.

The invention is fully disclosed in the following specification, of which the accompanying drawings form a part, in which the separate parts of my improvement are designated by suitable reference characters in each of the views, and in which—

Figure 1 is a side elevation of one form of the improved machine or apparatus which I employ; Fig. 2, a front view thereof; Fig. 3, a plan view thereof; Fig. 4 a plan view of a detail of the machine; Fig. 5 an end view of the detail shown in Fig. 4; Fig. 6 a partial transverse section of one of the elements of the construction shown in Fig. 4; Fig 7 an end view of that part of the device shown in Fig. 6; and Figs. 8 and 9 show, respectively, side and front elevations of a bearing which I employ to avoid undue spring action of the impress-bar and carrying-shaft when the corrugations to be produced in the sheets or plates are comparatively of small pitch in proportion to the length of the bars of the impress-dies.

Referring to Figs. 1, 2, and 3, $a$ $a$ are the side frames or housings braced and stayed at suitable intervals by the distance pieces $b$ $b$ and when necessary with the longitudinal beams $c$ $c$. The side frames or housings are furnished with bearings for the longitudinal shaft $d$, carrying the balance-wheel $e$ and the driving or band wheels $f$ and $g$. The shaft $d$ may also be adapted to receive motion from any other system of driving or motive power.

On the shaft $d$ is a pinion $h$, meshing into a spur-wheel $i$, mounted upon the shaft $j$, journaled in bearings $k$ $k$ in the side frames or housings $a$ $a$. The shaft $j$ carries also the pinion $l$ and between the side frames has its diameter suitably enlarged by the drum or drums $m$ $m$, designed to carry the impress-bars, as hereinafter more particularly described.

$j'$ $j^2$ $j^3$, $j^4$, and $j^5$ are shafts similar to $j$, journaled in bearings $k'$, $k^2$, $k^3$, $k^4$, and $k^5$, also carried in the side frames or housings $a$ $a$ and having their axes parallel to each other and to that of the shaft $j$. The shaft $j'$ carries a pinion $l'$, similar to $l$, meshing into a like pinion $l^2$ on the shaft $j^2$ and also into the pinion $l$ on the shaft $j$. The shafts $j'$, $j^2$, $j^3$, $j^4$, and $j^5$ are each enlarged or fitted with drums $m'$ $m^2$ $m^3$ $m^4$ $m^5$ between the side frames or housings $a$ $a$, similar to the shaft $j$. These enlargements or drums $m$ $m'$ $m^2$ $m^3$ $m^4$ $m^5$ are suitably spaced and grooved at their peripheries with grooves $o$ running parallel to their axes to receive and carry the bars $n$ $n'$ $n^2$, which, in conjunction with the end links $p$ $q$ (connecting the said bars) and the carrying-shafts $j$ with the drum enlargement $m$, constitute the flexible impress or corrugating dies employed.

The construction of one form of impress or corrugating die for use in a machine in accordance with my invention is illustrated by Figs. 4 and 5 and 6 7.

In Figs. 4 and 5, $n$ $n$ $n$ are a series of straight metallic bars of cylindrical or other section convenient for the corrugations they are intended to produce. The ends of each bar are reduced in diameter, and on the reduced portion links $p$ $q$ are jointedly fitted, flexibly connecting each bar to its adjacent bars, so that when linked together the axes of all the bars so connected are parallel to each other, and the bars and links combined form an endless chain or band. Figs. 6 and 7 illustrate by section and end view a pin connection for bars and links which may be employed in lieu of the arrangement shown in Figs. 4 and 5.

The endless chain of bars and links is so mounted in the machine as to embrace the drums of the adjacent shafts in a tier, and the bars taking into the grooves on the peripheries of the drums are carried and controlled by the same.

In the machine illustrated by Figs. 1, 2, and 3 the bars $n$ of the lower impress-die are carried and controlled by the drums $m$ and $m^5$, mounted, respectively, on the shafts $j$ and $j^5$. The bars $n'$ of the middle impress-die are carried and controlled by the drums $m'$ and $m^4$, mounted, respectively, on the shafts $j'$ and $j^4$. The bars $n^2$ of the upper impress-die are carried on and controlled by the drums $m^2$ and $m^3$, mounted, respectively, on the shafts $j^2$ and $j^3$.

Two impress-dies are in relative working position for forming a corrugation when a bar of the one meshes evenly into the hollow formed by two contiguous bars of the adjacent die with a clearance-space between the bars equal to the thickness of the material to be corrugated.

The relative direction of movement of adjacent dies when in action is indicated by the arrows in Fig. 1. A feed-table $r$ is located at the feed or entry side of each pair of impress-dies, which is capable of a reciprocating motion, imparted through the eccentrics $t\ t$ and the jointedly-connected rods $u\ u$. Suitable stops on the table provide for the correct adjustment of the sheet to be corrugated, which is also steadied during its passage between the corrugating-dies by the keep-bar $v$.

$w\ w$ are receiving-tables.

From the foregoing description the construction and operation of my invention will be readily understood by those skilled in the art to which it appertains. The sheet or plate to be operated upon having been placed on one of the tables $r$ is passed under the keep-bar $v$ and adjusted to the stops on the table and by the reciprocating movement of same fed forward until it engages with the inwardly-revolving dies and is by them carried forward and impressed or corrugated as they come into juxtaposition in course of travel with their respective carrying-shafts or drums. After corrugation the plate or sheet is carried by the dies and deposited by them onto the delivery-table.

Although the machine has been described as operating upon a single sheet of metal, two or more sheets may be simultaneously operated upon from either side of the machine. Moreover, I do not limit myself to the number of sets of dies to be simultaneously employed in any one machine.

Having fully described my invention, what I claim as new, and desire to secure by Letters Patent, is—

1. In a machine for corrugating sheet metal, the combination of continuously-rotatable drums, one of said drums being provided with longitudinal ribs or bars and corresponding grooves, a rotatable endless flexible die mounted on and movable on said drums and composed of transverse members loosely connected and which operate in connection with said ribs or bars and with said grooves, and a bearing block or drum mounted over said die and said drum and operating in connection with said die and provided with longitudinally-arranged ribs or bars and corresponding grooves, substantially as shown and described.

2. In a machine for corrugating sheet metal, the combination of continuously-rotatable drums, one of said drums being grooved londitudinally of its face to form corresponding bars or ribs and a corrugating flexible endless die mounted on said drums and comprising a series of transverse parallel bars flexibly connected, the grooves in said drum being spaced so as to receive the bars of the endless flexible die, substantially as shown and described.

3. In a machine for corrugating sheet metal, the combination of continuously-rotatable drums, one of said drums being grooved longitudinally of its face to form corresponding bars or ribs, a corrugating flexible endless die mounted on said drums and comprising a series of transverse parallel bars flexibly connected, the grooves in said drum being spaced so as to receive the bars of the endless flexible die, and a rotatable bearing block or drum mounted over said die and over said grooved drum, said bearing block or drum being grooved longitudinally to form corresponding ribs which operate in connection with the bars of said die, substantially as shown and described.

4. In a machine for corrugating sheet metal, an endless die composed of a plurality of parallel transversely-arranged bars or tubes linked together, continuously-rotatable drums on which said die is mounted, one or said drums being provided with a plurality of longitudinally-arranged grooves forming croresponding ribs or bars spaced to correspond with the spaces between the bars or tubes of the die, a rotatable bearing block or drum mounted over the die and over the grooved drum and operating in connection with the die and provided with longitudinal grooves and corresponding ribs or bars, means for rotating said first-named drums and said bearing-block or drum in unison so as to cause the endless die to travel around said first-named drums in juxtaposition with the ribs or bars on the face of the bearing-block or drum and coacting with the said ribs or bars so that the bars or tubes of the endless die mesh with the ribs or bars of the grooved drum, snbstantially as shown and described.

5. A machine for corrugating metal sheets, comprising a frame, two endless dies of metallic bars or tubes linked together, each die embracing two rotatable shafts provided with drums one of which is transversely grooved in the face thereof to receive and carry the bars or tubes of the endless die, the axes of both drums being parallel one to another and in the same plane, a second coacting arrangement of shafts, drums and endless die composed of bars or tubes, the axes of the drums of the second set being in a plane parallel to those of the first-named set and directly over them and at a distance therefrom convenient for the intermeshing of the bars or tubes of the separate sets of dies with a clearance-space between equal to the thickness of the sheet of metal to be corrugated, means for adjusting and regulating the depth of the intermesh of the bars or tubes of the separate sets of dies, gearing transmitting motion to all of said shafts so that they rotate in unison thus causing the bars or tubes of the endless dies carried by the separate sets of drums to travel forwardly in juxtaposition one with the other so that the bars of one set mesh with the bars of the other set, a table upon which the sheet to be corrugated is placed, and means for imparting a forward movement to the sheet to be corrugated, substantially as shown and described.

In testimony that I claim the foregoing as my invention I have signed my name, in presence of the subscribing witnesses, this 21st day of September, 1905.

WILLIAM GEORGE CAUSER.

Witnesses:
DANIEL E. CAUSER,
EDWARD FREDERICK EVANS.